(12) United States Patent
Wexler et al.

(10) Patent No.: US 8,584,406 B2
(45) Date of Patent: Nov. 19, 2013

(54) HOLE-THRU-LAMINATE MOUNTING SUPPORTS FOR PHOTOVOLTAIC MODULES

(75) Inventors: Jason Wexler, Oakland, CA (US); Jonathan Botkin, El Cerrito, CA (US); Matthew Culligan, Berkeley, CA (US); Adam Detrick, Petaluma, CA (US)

(73) Assignee: SunPower Corporation, San Jose, CA (US)

( * ) Notice: Subject to any disclaimer, the term of this patent is extended or adjusted under 35 U.S.C. 154(b) by 847 days.

(21) Appl. No.: 12/784,392

(22) Filed: May 20, 2010

(65) Prior Publication Data

US 2010/0294343 A1     Nov. 25, 2010

Related U.S. Application Data

(60) Provisional application No. 61/179,991, filed on May 20, 2009.

(51) Int. Cl.
  *E04D 13/18*  (2006.01)
  *E04H 14/00*  (2006.01)

(52) U.S. Cl.
  USPC ........... 52/173.3; 52/479; 52/483.1; 108/150; 108/158

(58) Field of Classification Search
  USPC .............. 52/173.3, 474, 479, 483.1; 136/244, 136/251; 248/127; 108/153.1, 154, 157.1, 108/158, 150
  See application file for complete search history.

(56) References Cited

U.S. PATENT DOCUMENTS

| | | | |
|---|---|---|---|
| 4,406,105 A | 9/1983 | Colvin | |
| 4,581,868 A | 4/1986 | McCann | |
| 4,689,928 A | 9/1987 | Dutton et al. | |
| 5,027,567 A | 7/1991 | Roberts | |
| 5,252,141 A | 10/1993 | Inoue et al. | |
| 5,540,514 A | 7/1996 | Demars et al. | |
| 5,647,915 A | 7/1997 | Zukerman | |
| 5,787,662 A | 8/1998 | Danz | |
| 6,138,434 A | 10/2000 | Demars et al. | |
| 6,201,180 B1 * | 3/2001 | Meyer et al. | 136/244 |
| 6,786,012 B2 * | 9/2004 | Bradley, Jr. | 52/173.3 |
| 2002/0036010 A1 * | 3/2002 | Yamawaki et al. | 136/251 |
| 2003/0070368 A1 * | 4/2003 | Shingleton | 52/173.3 |
| 2003/0094193 A1 * | 5/2003 | Mapes et al. | 136/244 |
| 2003/0121220 A1 * | 7/2003 | Bradley, Jr. | 52/173.3 |
| 2006/0000178 A1 | 1/2006 | Almy | |
| 2006/0053706 A1 * | 3/2006 | Russell | 52/173.3 |
| 2008/0172955 A1 * | 7/2008 | McClintock et al. | 52/173.3 |

OTHER PUBLICATIONS

International Search Report and Written Opinion from PCT/US 07/74813 mailed Oct. 30, 2008, 13 pgs.

* cited by examiner

*Primary Examiner* — Brian Glessner
*Assistant Examiner* — Brian D Mattei
(74) *Attorney, Agent, or Firm* — Blakely Sokoloff Taylor Zafman LLP (57) ABSTRACT

A mounting support for a photovoltaic module is described. The mounting support includes a pedestal having a surface adaptable to receive a flat side of a photovoltaic module laminate. A hole is disposed in the pedestal, the hole adaptable to receive a bolt or a pin used to couple the pedestal to the flat side of the photovoltaic module laminate.

6 Claims, 6 Drawing Sheets

HOLE-THRU-LAMINATE MOUNTING SUPPORTS FOR PHOTOVOLTAIC MODULES

CROSS REFERENCE TO RELATED APPLICATIONS

This application claims the benefit of U.S. Provisional Application No. 61/179,991, filed May 20, 2009, the entire contents of which are hereby incorporated by reference herein.

This invention was made with Government support under Contract No. DEFC36-07GO17043 awarded by the United States Department of Engery. The Government has certain rights in this invention.

TECHNICAL FIELD

Embodiments of the present invention are in the field of photovoltaic systems and, in particular, hole-thru-laminate mounting supports for photovoltaic modules.

BACKGROUND

Photovoltaic cells, commonly known as solar cells, are well known devices for direct conversion of solar radiation into electrical energy. Generally, solar cells are fabricated on a semiconductor wafer or substrate using semiconductor processing techniques to form a p-n junction near a surface of the substrate. Solar radiation impinging on the surface of the substrate creates electron and hole pairs in the bulk of the substrate, which migrate to p-doped and n-doped regions in the substrate, thereby generating a voltage differential between the doped regions. The doped regions are coupled to metal contacts on the solar cell to direct an electrical current from the cell to an external circuit coupled thereto. Generally, an array of solar cells, each solar cell interconnected, is mounted on a common or shared platform to provide a photovoltaic module. A plurality of photovoltaic modules or module groups may be electrically coupled to an electrical power distribution network, forming a photovoltaic system.

A photovoltaic module may be composed of a photovoltaic laminate. Mounting such a photovoltaic module, e.g. on a roof-top, may be difficult because the photovoltaic laminate may be relatively large and readily breakable. A photovoltaic laminate may be mounted by securing the laminate by its edge with glue or by physical clamping. Such approaches may prove expensive and bulky as mounting techniques and apparatuses for mounting photovoltaic modules composed of photovoltaic laminates. Accordingly, additional improvements are needed in the evolution of photovoltaic laminate mounting technology.

DETAILED DESCRIPTION

A hole-thru-laminate mounting support for a photovoltaic module is described herein. In the following description, numerous specific details are set forth, such as specific photovoltaic system arrangements, in order to provide a thorough understanding of the present invention. It will be apparent to one skilled in the art that embodiments of the present invention may be practiced without these specific details. In other instances, well-known fabrication operations, such as solar cell lamination operations, are not described in detail in order to not unnecessarily obscure embodiments of the present invention. Furthermore, it is to be understood that the various embodiments shown in the Figures are illustrative representations and are not necessarily drawn to scale.

Disclosed herein is a mounting support for a photovoltaic module. The mounting support may include a pedestal having a surface adaptable to receive a flat side of a photovoltaic module laminate. In one embodiment, a hole is disposed in the pedestal, the hole adaptable to receive a bolt or a pin used to couple the pedestal to the flat side of the photovoltaic module laminate. Also disclosed herein is a photovoltaic system. The photovoltaic system may include a plurality of photovoltaic module laminates. In one embodiment, the photovoltaic system also includes a plurality of pedestals. Each pedestal includes a surface coupled to a flat side of one or more of the photovoltaic module laminates and one or more holes disposed in the pedestal. A plurality of bolts or pins couples each pedestal of the plurality of pedestals to one or more of the plurality of photovoltaic module laminates, each bolt or pin disposed through one of the plurality of photovoltaic module laminates and inside of one of the one or more holes. Also disclosed herein is a method for fabricating a photovoltaic system. The method may include providing a plurality of photovoltaic module laminates. In one embodiment, a plurality of pedestals is also provided. Each pedestal includes a surface for coupling to a flat side of one or more of the plurality of photovoltaic module laminates and one or more holes disposed in the pedestal. Each pedestal of the plurality of pedestals is coupled to one or more of the plurality of photovoltaic module laminates with a plurality of bolts or pins, the coupling comprising inserting each bolt or pin through one of the plurality of photovoltaic module laminates and inside of one of the one or more holes.

A mounting support for a photovoltaic module laminate, the mounting support including a pedestal, may be useful for optimizing or maximizing the amount of radiation collectable by a bifacial solar module. For example, in accordance with an embodiment of the present invention, the use of a mounting support including a pedestal essentially eliminates the need to secure the photovoltaic module laminate by its edge, conventional edge-securing otherwise blocking back-side radiation collection around the edge of the module. Furthermore, such a mounting support may be smaller and less expensive than conventional mounting structures. In accordance with another embodiment of the present invention, a mounting support for a photovoltaic module laminate, the mounting support including a pedestal, does not significantly impede or interfere with cooling, e.g. by wind or air gradients, of the photovoltaic module laminate. Such impedance or interference of cooling by conventional mounting supports may lead to reduced efficiency of energy conversion by a mounted solar module.

In accordance with an embodiment of the present invention, a hole-thru-laminate approach is enabled by using a pedestal as a mounting support for a photovoltaic module laminate. For example, in one embodiment, a bolt or pin is used to couple the mounting support directly to the photovoltaic module laminate via aligned holes formed directly in the pedestal of the mounting support and the photovoltaic module laminate. In a specific embodiment, the direct hole-through-laminate mounting approach is enabled by bifacial arrangement (e.g. a lower solar cell density and, therefore, space for holes between the cells) of the photovoltaic module laminate. In a particular example of that embodiment, the mounting support only minimally shades the back-side of a bifacial solar cell module arrangement because already available space between the cells is used for holes. However, in another specific embodiment, the direct hole-through-laminate mounting approach is not hindered by a higher density arrangement, such as a mono-facial solar cell module arrangement. In accordance with an embodiment of the present invention, a mounting support for a photovoltaic module laminate, the mounting support including a pedestal, is used for mounting a plurality of photovoltaic module laminates on a roof-top having less than approximately 5 degree tilt. In an embodiment, a conventional thickness of glass used in a photovoltaic laminate module otherwise required for use with a conventional mounting system can be reduced because the mounting support, including the pedestal, is better able to accommodate photovoltaic laminate modules with increased fragility.

Figure 1A:
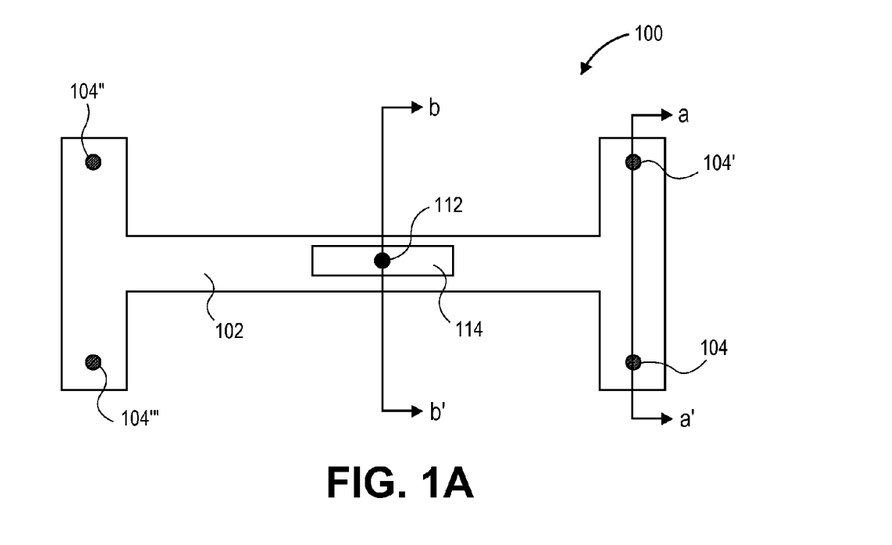
FIG. 1A illustrates a top-down or plan view of a mounting support for a photovoltaic module, in accordance with an embodiment of the present invention.

In an aspect of the present invention, a mounting support for a photovoltaic module is provided. FIG. 1A illustrates a top-down view of a mounting support for a photovoltaic module, in accordance with an embodiment of the present invention.

Referring to FIG. 1A, a mounting support for a photovoltaic module includes a pedestal 100 having a surface 102 adaptable to receive a flat side of a photovoltaic module laminate. A hole 104 is disposed in pedestal 100, hole 104 adaptable to receive a bolt or a pin used to couple pedestal 100 to the flat side of a photovoltaic module laminate.

In an embodiment, pedestal 100 includes a bottom portion detachable from a top portion. For example, FIG. 1B illustrates a cross-sectional view of the mounting support of FIG. 1A, taken along the a-a' axis, in accordance with an embodiment of the present invention.

Figure 1B:
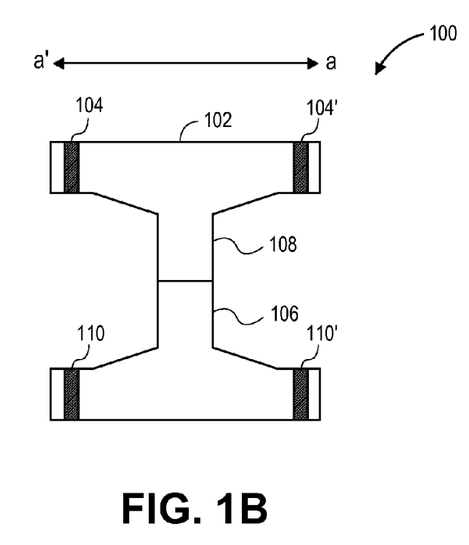
FIG. 1B illustrates a cross-sectional view of the mounting support of FIG. 1A, taken along the a-a' axis, in accordance with an embodiment of the present invention.

Referring to FIG. 1B, pedestal 100 includes a bottom portion 106 detachable from a top portion 108. In one embodiment, top portion 108 includes hole 104, as depicted in FIG. 1B. In an embodiment, bottom portion 106 includes a second hole 110, as is also depicted in FIG. 1B. In a specific embodiment, second hole 110 is adaptable to receive a bolt or a pin used to couple bottom portion 106 of pedestal 100 to a roof or ground support system. In another specific embodiment, second hole 110 is adaptable to receive a bolt or a pin used to couple bottom portion 106 of pedestal 100 to a reflective layer.

Referring to both FIGS. 1A and 1B, in accordance with an embodiment of the present invention, both bottom portion 106 and top portion 108 of pedestal 100 minor the same dog-bone shape. In one embodiment, top portion 108 includes three or more additional holes 104', 104'' and 104''' disposed therein, the three or more additional holes 104', 104'' and 104''' adaptable to receive a bolt or a pin used to couple pedestal 100 to a flat side of one or more additional photovoltaic module laminates. In one embodiment, bottom portion 106 also includes three or more additional holes disposed therein (additional hole 110' is shown in FIG. 1B), the three or more additional holes adaptable to receive a bolt or a pin used to couple pedestal 100 to a roof or ground support system or to one or more reflective layers. By using a top and bottom portion of pedestal 100 that mirror the same shape, convenience of fabrication may be realized. For example, in an embodiment, the same fabrication mold is used for producing both bottom portion 106 and top portion 108 of pedestal 100. In one embodiment, both bottom portion 106 and top portion 108 of pedestal 100 are fabricated from the same fabrication mold and are composed of a material such as, but not limited to Noryl® plastic. In an embodiment, not depicted, instead of mirroring the same dog-bone shape, both bottom portion 106 and top portion 108 of pedestal 100 minor the same cross shape.

Bottom portion 106 and top portion 108 of pedestal 100 may be coupled together by a process that provides a seemingly unified pedestal for supporting a photovoltaic module. For example, FIG. 1C illustrates a cross-sectional view of the mounting support of FIG. 1A, taken along the b-b' axis, in accordance with an embodiment of the present invention.

Figure 1C:
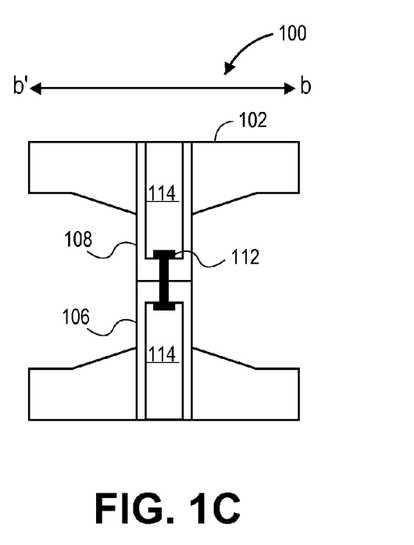
FIG. 1C illustrates a cross-sectional view of the mounting support of FIG. 1A, taken along the b-b' axis, in accordance with an embodiment of the present invention.

Referring to FIGS. 1A and 1C, both bottom portion 106 and top portion 108 of pedestal 100 include a trench 114 having a hole adaptable to receive a bolt or a pin 112 used to couple bottom portion 106 and top portion 108. In an embodiment, upon coupling bottom portion 106 and top portion 108, a seemingly unified pedestal 100 is provided for supporting a photovoltaic module, pedestal 100 having a surface 102 adaptable to receive a flat side of a photovoltaic module laminate.

Figure 2A:
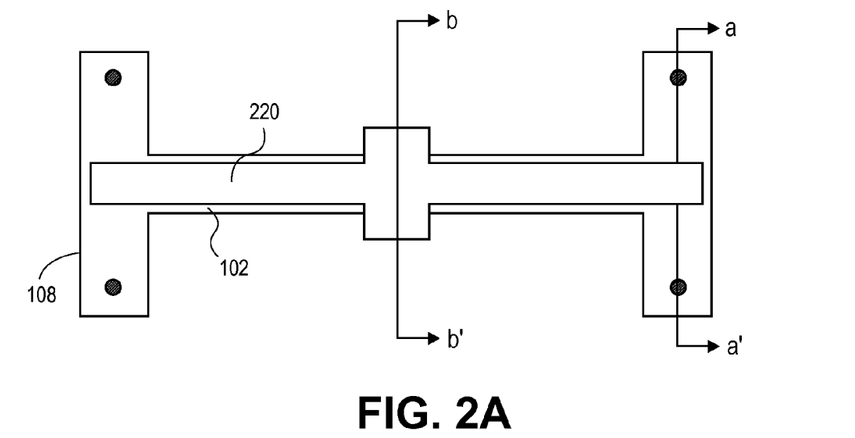
FIG. 2A illustrates a top-down or plan view of a mounting support for a photovoltaic module, the mounting support including a spacer, in accordance with an embodiment of the present invention.
Figure 2B:
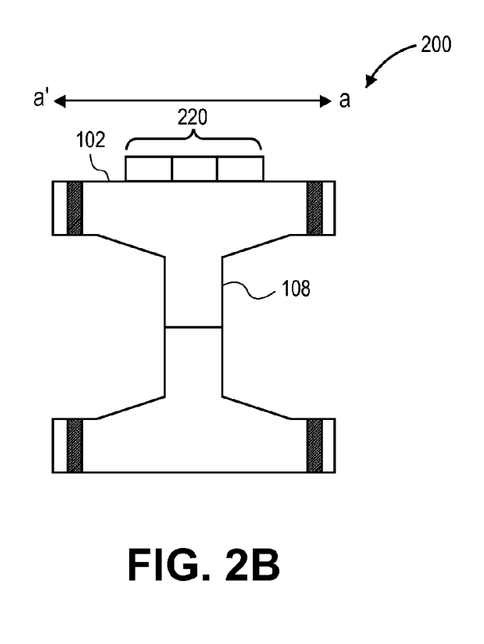
FIG. 2B illustrates a cross-sectional view of the mounting support of FIG. 2A, taken along the a-a' axis, the mounting support including a spacer, in accordance with an embodiment of the present invention.
Figure 2C:
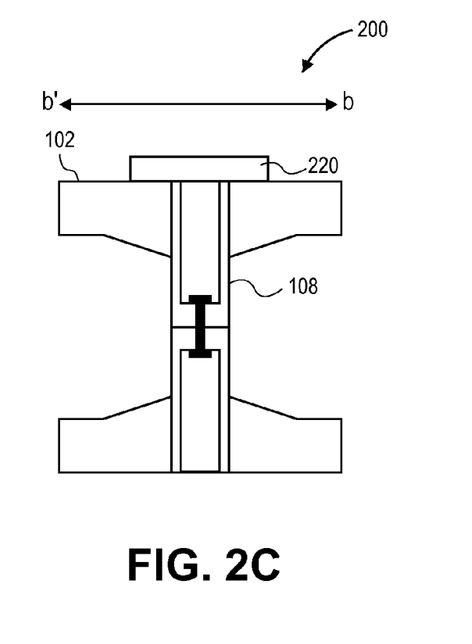
FIG. 2C illustrates a cross-sectional view of the mounting support of FIG. 2A, taken along the b-b' axis, the mounting support including a spacer, in accordance with an embodiment of the present invention.

In an aspect of the present invention, pedestal 100 may further include a spacer to aid in the isolation of a plurality of photovoltaic module laminates from each other and to aid in the alignment of the modules with respect to each other (e.g. long straight rows). For example, FIG. 2A illustrates a top-down view of a mounting support for a photovoltaic module, the mounting support including a spacer, in accordance with an embodiment of the present invention. FIG. 2B illustrates a cross-sectional view of the mounting support of FIG. 2A, taken along the a-a' axis, the mounting support including a spacer, in accordance with an embodiment of the present invention. FIG. 2C illustrates a cross-sectional view of the mounting support of FIG. 2A, taken along the b-b' axis, the mounting support including a spacer, in accordance with an embodiment of the present invention.

Referring to FIGS. 2A-2C, a pedestal 200 includes a spacer 220 adaptable to be disposed on, but detachable from, top portion 108 of pedestal 200. In one embodiment, the top surface of spacer 220 is above surface 102 of pedestal 100, surface 102 adaptable to receive a flat side of a photovoltaic module laminate. In accordance with an embodiment of the present invention, spacer 220 has a cross-shape, as depicted in FIGS. 2A-2C. In an embodiment, spacer 220 couples to top portion 108 of pedestal 200 by a mechanical fastener, either molded into parts 108 and 220, or separate. Alternatively, an adhesive may be used.

In another aspect of the present invention, a pedestal may be composed of a unitary body, as opposed to two mirrored portions. For example, FIG. 3 illustrates a cross-sectional view of a mounting support for a photovoltaic module, the mounting support including a pedestal consisting essentially of a unitary body, in accordance with an embodiment of the present invention.

Figure 3:
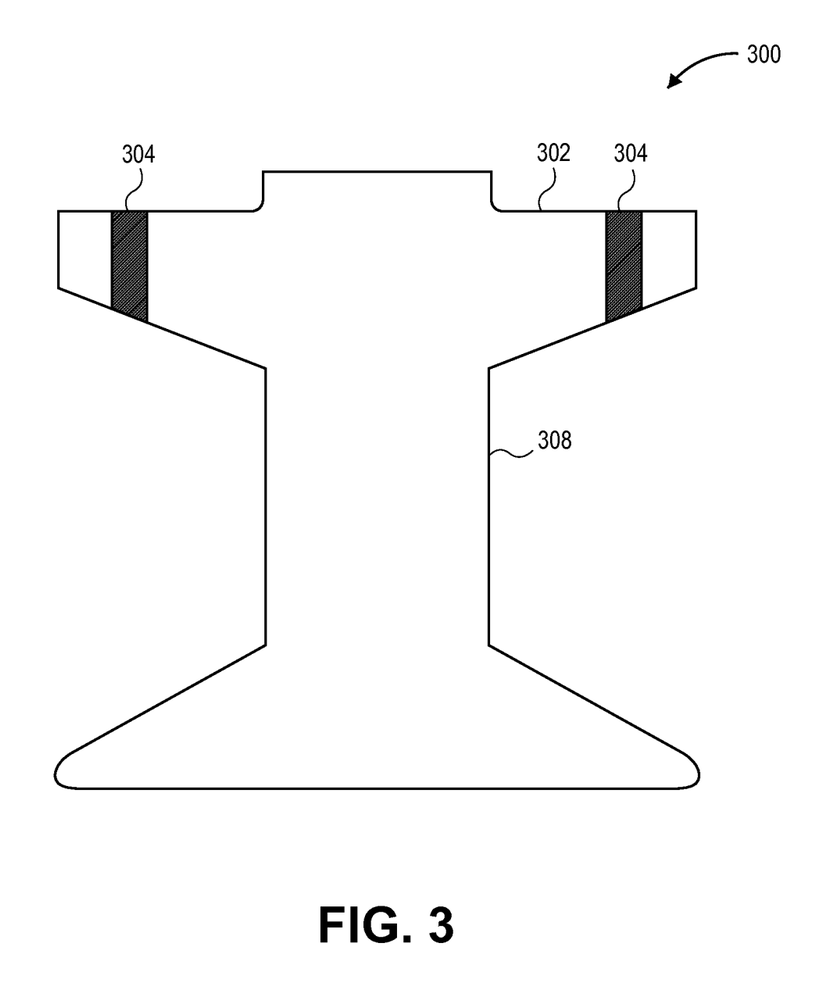
FIG. 3 illustrates a cross-sectional view of a mounting support for a photovoltaic module, the mounting support including a pedestal consisting essentially of a unitary body, in accordance with an embodiment of the present invention.

Referring to FIG. 3, a pedestal 300 is composed of a unitary body 308. Pedestal 300 includes surfaces 302 adaptable to receive a flat side of one or more photovoltaic module laminates. Pedestal 300 also includes holes 304 disposed in pedestal 300, holes 304 adaptable to receive a bolt or a pin used to couple pedestal 300 to the flat side of the one or more photovoltaic module laminates. In accordance with an embodiment of the present invention, unitary body 308 of pedestal 300 is fabricated from a single mold process.

In the case that a unitary arrangement is used for a pedestal in a mounting support, the unitary arrangement is not limited to that configuration depicted in and described in association with FIG. 3. For example, in an embodiment, a different unitary arrangement is used, depending upon the location of the pedestal in a photovoltaic system including a plurality of pedestals. In one embodiment, a unitary central pedestal, such as but not limited to the pedestal described in FIG. 3, is used at the intersection of four photovoltaic laminate modules. In that embodiment, an edge unitary pedestal is used at the edge of the photovoltaic system where only two photovoltaic module laminates meet, and a corner unitary pedestal is used at the corner of the photovoltaic system where only one photovoltaic module laminate resides. Alternatively, in accordance with yet another embodiment of the present invention, a pedestal in a mounting support is composed of two or more portions separated vertically, as opposed to horizontally like the pedestals described in association with FIGS. 1A-1C and 2A-2C.

Figure 4A:
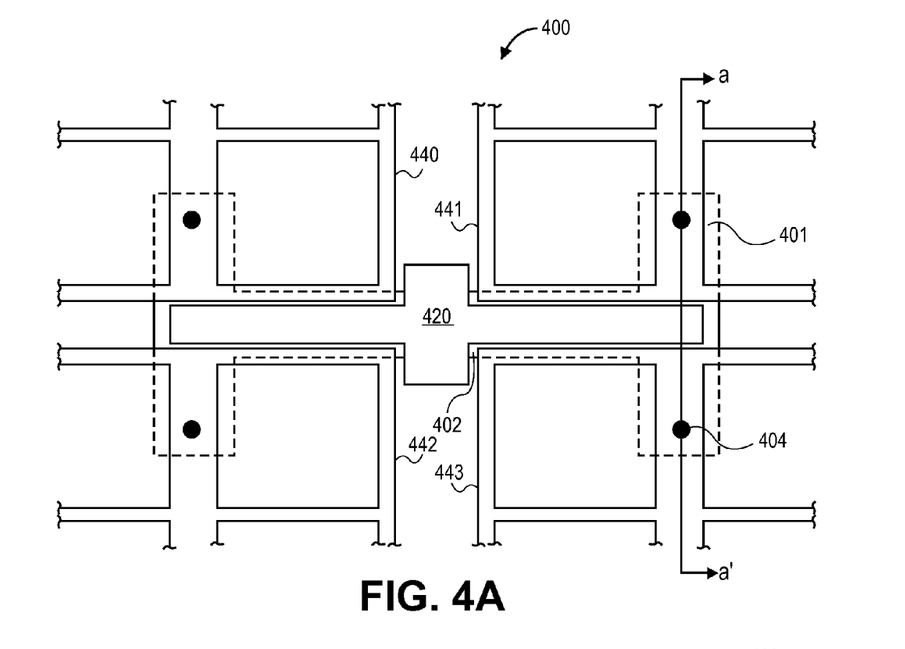
FIG. 4A illustrates a top-down or plan view of a photovoltaic system including a mounting support for a photovoltaic module, in accordance with an embodiment of the present invention.
Figure 4B:
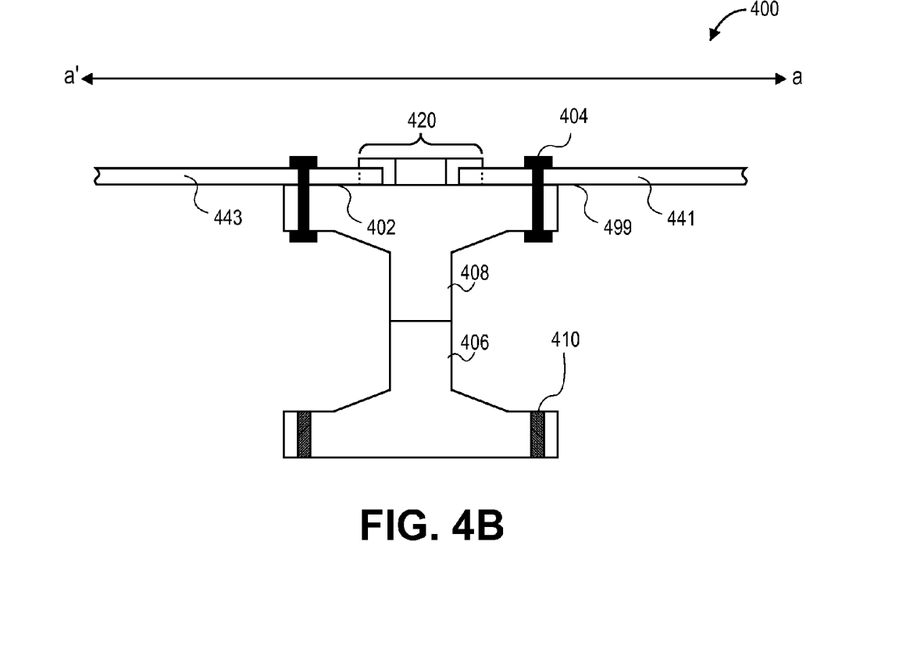
FIG. 4B illustrates a cross-sectional view of the photovoltaic system of FIG. 4A, taken along the a-a' axis, in accordance with an embodiment of the present invention.

In an aspect of the present invention, a photovoltaic system includes one or more pedestals, such as those pedestals described above. For example, FIG. 4A illustrates a top-down view of a photovoltaic system including a mounting support for a photovoltaic module, in accordance with an embodiment of the present invention. FIG. 4B illustrates a cross-sectional view of the photovoltaic system of FIG. 4A, taken along the a-a' axis, in accordance with an embodiment of the present invention.

Referring to FIGS. 4A and 4B, a photovoltaic system 400 includes a plurality of photovoltaic module laminates 440, 441, 442 and 443. Photovoltaic system 400 also includes a plurality of pedestals (one of which, pedestal 401, is depicted in FIGS. 4A and 4B). Each pedestal 401 includes a surface 402 coupled to a flat side 499 of one or more of the plurality of photovoltaic module laminates 440, 441, 442 and 443. One or more holes is disposed in pedestal 401 and a plurality of bolts or pins 404 couples each pedestal 401 of the plurality of pedestals to one or more of the plurality of photovoltaic module laminates 440, 441, 442 and 443. Each bolt or pin 404 is disposed through one of the plurality of photovoltaic module laminates 440, 441, 442 and 443 and inside of one of the one or more holes. Thus, in accordance with an embodiment of the present invention, a hole-thru-laminate approach is used to fabricate a photovoltaic system.

Photovoltaic module laminates 440, 441, 442 and 443 may be composed of a variety of layers used for optimizing solar energy conversion. For example, in accordance with an embodiment of the present invention, photovoltaic module laminates 440, 441, 442 and 443 each include a layer of EVA material, a layer with an array of solar cells, a sheet of glass, a J-Box and electrical buses. Referring again to FIG. 4A, the individual solar cells of photovoltaic module laminates 440, 441, 442 and 443 are represented by the smaller squares within each of illustrated photovoltaic module laminates 440, 441, 442 and 443. In one embodiment, each photovoltaic module laminate 440, 441, 442 and 443 is a bifacial laminate, arranged to accept solar radiation impingent on at least two sides of the laminate, e.g., impinging upon the top-surface and the back-surface of the laminate. In a specific embodiment, each photovoltaic module laminate 440, 441, 442 and 443 is a bifacial laminate having less than approximately 70% solar cell array density.

The holes formed in each photovoltaic module laminate 440, 441, 442 and 443 may include a flexible rubber grommet. In an embodiment, inclusion of such a grommet in each hole allows each photovoltaic module laminate 440, 441, 442 and 443 to move relative to a supporting pedestal and accommodates slight changes in the slope of a roof-top on which a photovoltaic system is mounted. The location of the holes in each photovoltaic module laminate 440, 441, 442 and 443 may be selected to optimize the positioning of supporting pedestals without shorting adjacent solar cells. In an embodiment, each photovoltaic module laminate 440, 441, 442 and 443 includes 4 holes, each hole at the corner of the laminate. In another embodiment, each photovoltaic module laminate 440, 441, 442 and 443 includes 4 holes, each hole offset from the corners and within the array of solar cells. In another embodiment, the size of each photovoltaic module laminate 440, 441, 442 and 443 is extended without adding additional solar cells, in order to accommodate the holes.

Each pedestal 401 of the plurality of pedestals may include a bottom portion detachable from a top portion. Referring to FIG. 4B, in an embodiment, pedestal 401 includes a bottom portion 406 detachable from a top portion 408. In an embodiment, top portion 408 includes the one or more holes described above for pedestal 401. In an embodiment, bottom portion 406 includes an additional one or more holes 410. In a specific embodiment, both bottom portion 406 and top portion 408 of pedestal 401 mirror the same dog-bone shape. In that embodiment, top portion 408 includes four or more holes disposed therein, the four or more holes adaptable to receive bolts or pins used to couple pedestal 401 to the flat side of photovoltaic module laminates 440, 441, 442 and 443, as depicted in FIG. 4A. In an alternative embodiment, each pedestal 401 of the plurality of pedestals consists essentially of a unitary body.

In accordance with an embodiment of the present invention, each pedestal 401 of the plurality of pedestals further includes a spacer 420, as depicted in both FIGS. 4A and 4B. In a specific embodiment, spacer 420 is adaptable to be disposed on, but detachable from, top portion 408 of pedestal 401. In a particular embodiment, the top surface of spacer 420 is above surface 402 of pedestal 401, surface 402 of pedestal 401 adaptable to receive the flat sides of each of the plurality of photovoltaic module laminates 440, 441, 442 and 443. In that embodiment, spacer 420 is adjacent to each of the plurality of photovoltaic module laminates 440, 441, 442 and 443, as depicted in FIG. 4A.

Figure 5A:
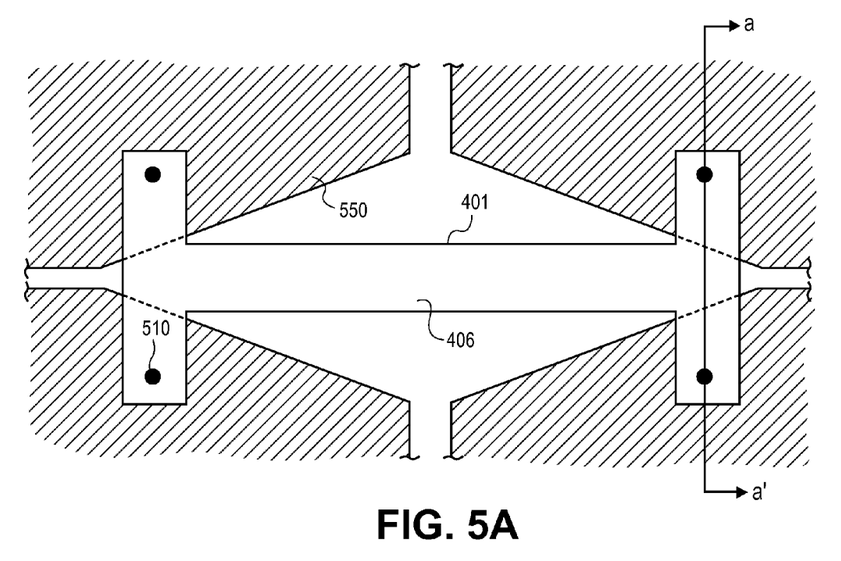
FIG. 5A illustrates a bottom-up view of a photovoltaic system including a mounting support for a photovoltaic module, in accordance with an embodiment of the present invention.
Figure 5B:
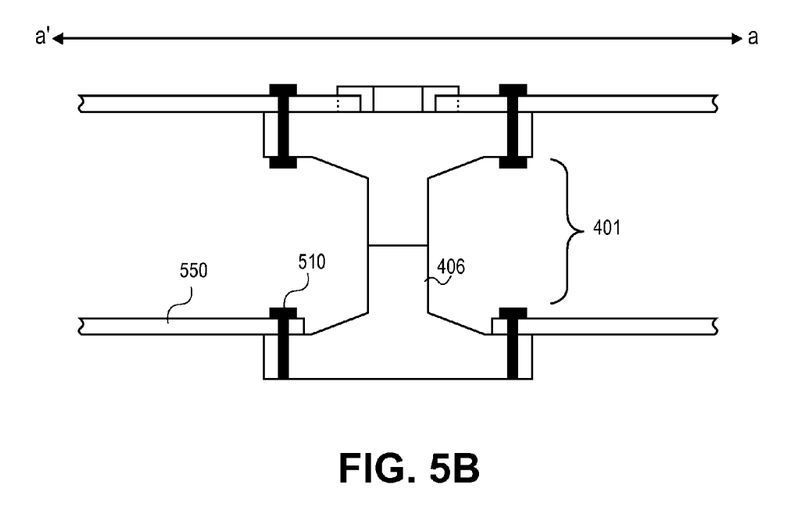
FIG. 5B illustrates a cross-sectional view of the photovoltaic system of FIG. 5A, taken along the a-a' axis, in accordance with an embodiment of the present invention.

In an aspect of the present invention, reflective layers may be included in a photovoltaic system. For example, FIG. 5A illustrates a bottom-up view of a photovoltaic system including a mounting support for a photovoltaic module, in accordance with an embodiment of the present invention. FIG. 5B illustrates a cross-sectional view of the photovoltaic system of FIG. 5A, taken along the a-a' axis, in accordance with an embodiment of the present invention.

Referring to both FIGS. 5A and 5B, the additional one or more holes 410 of bottom portion 406 of pedestal 401 is adaptable to receive a bolt or a pin 510 used to couple bottom portion 406 of pedestal 401 to one or more reflective layers 550. In one embodiment, bottom portion 406 includes four or more holes disposed therein, the four or more holes adaptable to receive bolts or pins 510 used to couple pedestal 401 to four reflective sheets 550, as depicted in FIG. 5A. However, in an alternative embodiment, the additional one or more holes 410 of bottom portion 406 of pedestal 401 is adaptable to receive a bolt or a pin 510 used to couple bottom portion 406 of pedestal 401 to a roof or ground support system.

Figure 6:
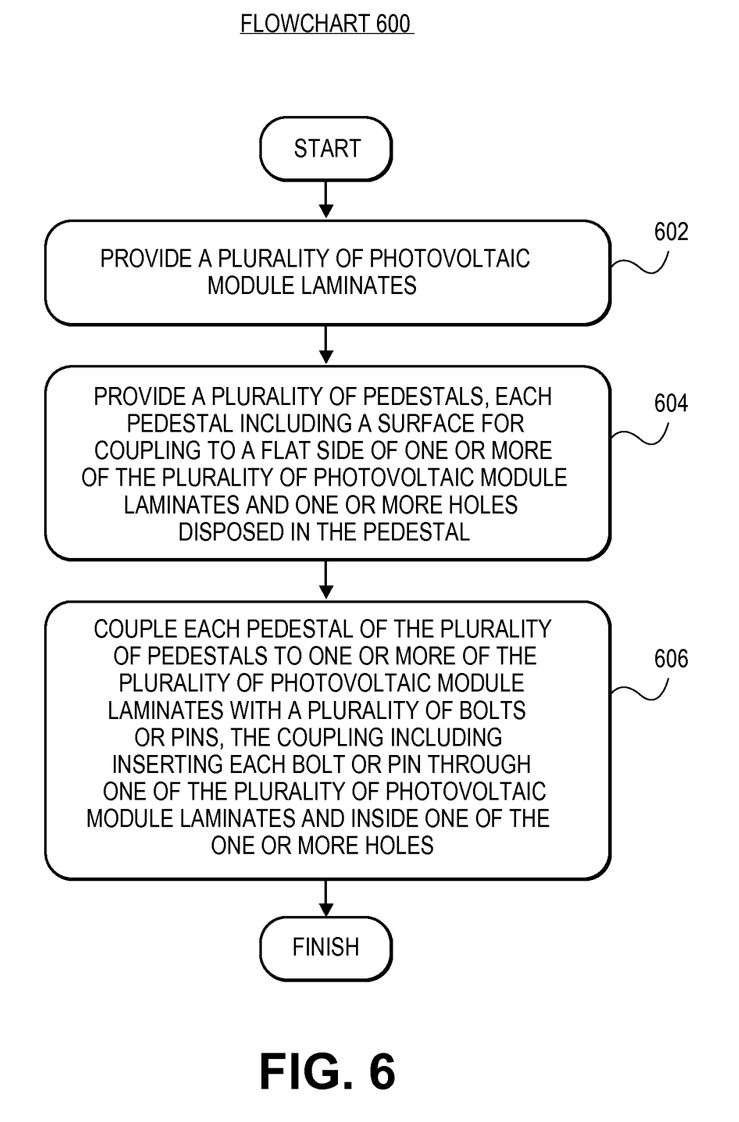
FIG. 6 depicts a Flowchart representing a series of operations in a method for fabricating a photovoltaic system, in accordance with an embodiment of the present invention.

In an aspect of the present invention, a photovoltaic system may be fabricated to include a plurality of photovoltaic module laminates and a plurality of pedestals. For example, FIG. 6 depicts a Flowchart 600 representing a series of operations in a method for fabricating a photovoltaic system, in accordance with an embodiment of the present invention.

Referring to operation 602 of Flowchart 600, a method for fabricating a photovoltaic system includes providing a plurality of photovoltaic module laminates. In accordance with an embodiment of the present invention, the plurality of photovoltaic module laminates includes photovoltaic module laminates such as those described in association with FIGS. 4A and 4B.

Referring to operation 604 of Flowchart 600, the method includes providing a plurality of pedestals, each pedestal including a surface for coupling to a flat side of one or more of the plurality of photovoltaic module laminates. In accordance with an embodiment of the present invention, each pedestal also includes one or more holes disposed in the pedestal.

In an embodiment, providing each pedestal of the plurality of pedestals includes providing a top portion of each pedestal, the top portion including the one or more holes. In that embodiment, providing each pedestal of the plurality of pedestals also includes providing a bottom portion of each pedestal, the bottom portion detachable from the top portion, and the bottom portion including an additional one or more holes. The top portion is then coupled to the bottom portion.

In a specific embodiment, providing both the bottom portion and the top portion of the pedestal includes providing portions mirroring the same dog-bone shape, the top portion comprising four or more holes disposed therein. The four or more holes are adaptable to receive bolts or pins used to couple the pedestal to the flat side of four photovoltaic module laminates. Also, in that embodiment, the bottom portion includes four or more holes disposed therein, the four or more holes adaptable to receive bolts or pins used to couple the pedestal to a roof or ground support system or to up to four reflective sheets.

In another specific embodiment, providing each pedestal of the plurality of pedestals further includes providing a spacer on, but detachable from, the top portion of the pedestal. The top surface of the spacer is above the surface of the pedestal that is provided for coupling to the flat side of the one or more of the plurality of photovoltaic module laminates. Additionally, the spacer is adjacent to one or more of the plurality of photovoltaic module laminates. In an alternative embodiment, providing each pedestal of the plurality of pedestals includes providing a pedestal consisting essentially of a unitary body.

In accordance with an embodiment of the present invention, the method further includes coupling the bottom portion of each pedestal to a reflective layer, the coupling including inserting a bolt or a pin through the reflective layer and inside of one of the additional one or more holes of the bottom portion. However, in an alternative embodiment, the method further includes coupling the bottom portion of each pedestal to a roof or ground support system, the coupling including inserting a bolt or a pin in each of the additional one or more holes of the bottom portion.

Referring to operation 606 of Flowchart 600, the method includes coupling each pedestal of the plurality of pedestals to one or more of the plurality of photovoltaic module laminates with a plurality of bolts or pins. In accordance with an embodiment of the present invention, the coupling includes inserting each bolt or pin through one of the plurality of photovoltaic module laminates and inside of one of the one or more holes.

Thus, a mounting support for a photovoltaic module has been disclosed. In accordance with an embodiment of the present invention, the mounting support includes a pedestal having a surface adaptable to receive a flat side of a photovoltaic module laminate. A hole is disposed in the pedestal, the hole adaptable to receive a bolt or a pin used to couple the pedestal to the flat side of the photovoltaic module laminate. In one embodiment, the pedestal includes a bottom portion detachable from a top portion, the top portion comprising the hole, and the bottom portion comprising a second hole. In another embodiment, the pedestal is composed of a unitary body.

What is claimed is:

1. A mounting support for a photovoltaic module, comprising:
   a pedestal comprising a bottom portion having a plan view shape and detachable from a top portion having the same plan view shape, the top portion comprising a surface adaptable to receive a flat side of a photovoltaic module laminate; and
   a hole disposed in the top portion of the pedestal, the hole adaptable to receive a bolt or a pin used to couple the pedestal to the flat side of the photovoltaic module laminate,
   wherein the bottom portion of the pedestal comprises a second hole,
   wherein the plan view shape is a dog-bone shape, wherein the top portion comprises three or more additional holes disposed therein, the three or more additional holes adaptable to receive a bolt or a pin used to couple the pedestal to the flat side of one or more additional photovoltaic module laminates, and wherein the bottom portion comprises three or more additional holes disposed therein, the three or more additional holes adaptable to receive a bolt or a pin used to couple the pedestal to a roof or ground support system or to one or more reflective layers.

2. The mounting support of claim 1, the pedestal further comprising:
   a spacer adaptable to be disposed on, but detachable from, the top portion of the pedestal, the top surface of the spacer above the surface of the pedestal adaptable to receive the flat side of the photovoltaic module laminate.

3. A photovoltaic system, comprising:
a plurality of photovoltaic module laminates;
a plurality of pedestals, each pedestal comprising:
   a surface coupled to a flat side of one or more of the plurality of photovoltaic module laminates; and
   a bottom portion having a plan view shape and detachable from a top portion having the same plan view shape,
   wherein the plan view shape is a dog-bone shape, wherein the top portion comprises four or more holes disposed therein, the four or more holes adaptable to receive bolts or pins used to couple the pedestal to the flat side of four photovoltaic module laminates, and wherein the bottom portion comprises four or more holes disposed therein, the four or more holes adaptable to receive bolts or pins used to couple the pedestal to a roof or ground support system or up to four reflective layers, and
   a plurality of bolts or pins to couple each pedestal of the plurality of pedestals to one or more of the plurality of photovoltaic module laminates, each bolt or pin disposed through one of the plurality of photovoltaic module laminates and inside of one of the four or more holes of the top portion.

4. The photovoltaic system of claim 3, each pedestal of the plurality of pedestals further comprising:
a spacer adaptable to be disposed on, but detachable from, the top portion of the pedestal, the top surface of the spacer above the surface of the pedestal adaptable to receive the flat side of the one or more of the plurality of photovoltaic module laminates, and the spacer adjacent to the one or more of the plurality of photovoltaic module laminates.

5. A method for fabricated a photovoltaic system, comprising:
providing a plurality of photovoltaic module laminates;
providing a plurality of pedestals, each pedestal comprising:
   a surface for coupling to a flat side of one or more of the plurality of photovoltaic module laminates;
   a top portion of each pedestal having a plan view shape, and
   a bottom portion of each pedestal having the same plan view shape, the bottom portion detachable from the top portion; and
coupling the to portion to the bottom portion;
wherein both the bottom portion and the top portion of the pedestal have a plan view shape comprising a dog-bone shape, the top portion comprising four or more holes disposed therein, the four or more holes adaptable to receive bolts or pins used to couple the pedestal to the flat side of four photovoltaic module laminates, and the bottom portion comprising four or more holes disposed therein, the four or more holes adaptable to receive bolts or pins used to couple the pedestal to a roof or ground support system or up to four reflective layers, and
coupling each pedestal of the plurality of pedestals to one or more of the plurality of photovoltaic module laminates with a plurality of bolts or pins, the coupling comprising inserting each bolt or pin through one of the plurality of photovoltaic module laminates and inside of one of the four or more holes of the top portion.

6. The method of claim 5, wherein providing each pedestal of the plurality of pedestals further comprises:
providing a spacer on, but detachable from, the top portion of the pedestal, the top surface of the spacer above the surface of the pedestal for coupling to the flat side of the one or more of the plurality of photovoltaic module laminates, and the spacer adjacent to one or more of the plurality of photovoltaic module laminates.

* * * * *